Sept. 30, 1958 F. A. D. SADLER 2,853,977
BOOSTERS FOR USE IN HYDRAULIC SYSTEMS
Filed May 23, 1956 3 Sheets-Sheet 1

INVENTOR
FRANCIS ANTONY DAWSON SADLER
by Walter S. Bleston
ATTORNEY

Sept. 30, 1958  F. A. D. SADLER  2,853,977
BOOSTERS FOR USE IN HYDRAULIC SYSTEMS
Filed May 23, 1956  3 Sheets-Sheet 2

INVENTOR
Francis Antony Dawson Sadler
by Walter S. Pleston
ATTORNEY

Sept. 30, 1958 F. A. D. SADLER 2,853,977
BOOSTERS FOR USE IN HYDRAULIC SYSTEMS
Filed May 23, 1956 3 Sheets-Sheet 3

INVENTOR
FRANCIS ANTONY DAWSON SADLER
by Walter S. Heston
ATTORNEY

United States Patent Office 2,853,977
Patented Sept. 30, 1958

2,853,977

BOOSTERS FOR USE IN HYDRAULIC SYSTEMS

Francis Antony Dawson Sadler, Little Aston, near Sutton Coldfield, England, assignor to Girling Limited, Birmingham, England, a British company Application May 23, 1956, Serial No. 586,860

3 Claims. (Cl. 121—46.5)

This invention relates to improvements in boosters for hydraulic systems of the type in which the energisation of the booster is controlled by a pressure-actuated valve in accordance with the pressure generated by manually operated means such as a master cylinder and the pressure produced in the hydraulic system by the booster.

According to the invention the energisation of a booster in a booster-assisted hydraulic system is controlled by a pair of valves or valve-heads pivotally mounted on opposite ends of a rocking lever actuated by axial movement in a bore of a control piston which is exposed at one end to manually generated fluid pressure and at the other end to the pressure in the hydraulic system.

The rocking lever is loaded by a spring which urges both valves towards their seatings, and when manually generated pressure is applied to the control piston that piston is moved axially in a direction to open one valve which energizes the booster cylinder. The booster cylinder applies pressure to the liquid in the hydraulic system and that pressure acts on the control piston in opposition to the manually generated pressure to close the first valve and open the other to de-energise the booster cylinder unless the manually generated pressure is maintained or increased.

The ends of the control piston will normally be of different diameters, that exposed to the pressure in the hydraulic system being the smaller, and any desired relationship between the manually generated pressure and the pressure applied by the booster to the hydraulic system can be obtained by selection of these diameters.

The improved booster is particularly adapted for use in an hydraulic braking system for vehicles in which a pedal operated master cylinder is connected to the wheel brake cylinders through an auxiliary hydraulic cylinder in axial alignment with the piston-rod of the booster cylinder which is advanced into the auxiliary cylinder to increase the pressure therein when the booster is energised, communication between the master cylinder and the auxiliary cylinder being cut off after the booster piston has advanced through a predetermined distance.

One practical form of booster unit for a vehicle braking system embodying the improved control valve is illustrated by way of example in the accompanying drawings in which.

Figure 1:
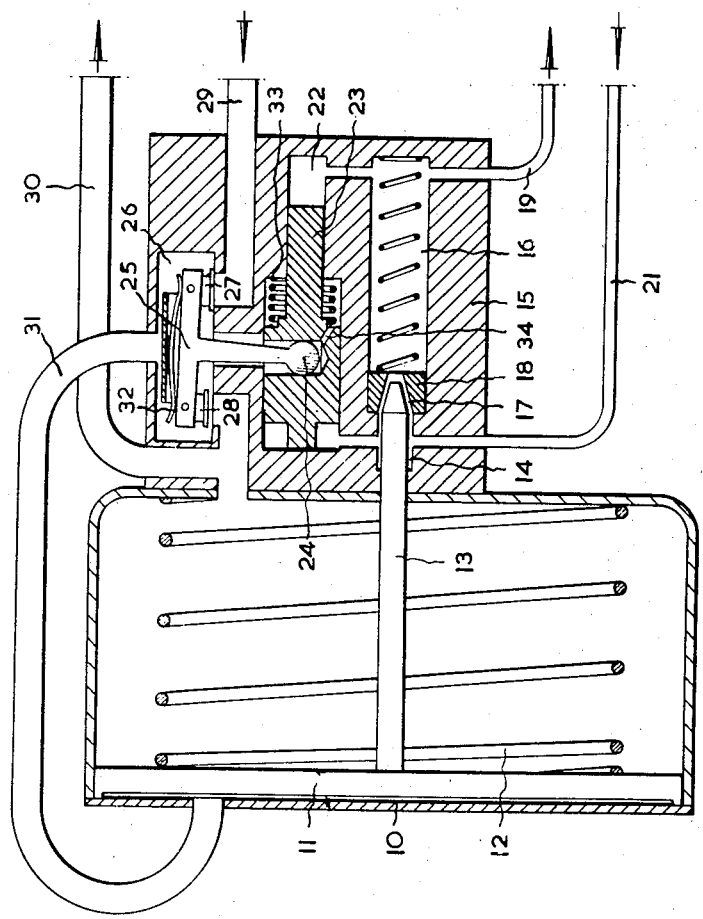
Figure 1 is a diagrammatic section showing the operation of the control valve in a booster of the vaccum-suspended type.

In Figure 1, 10 is a vacuum booster cylinder of the vacuum-suspended type. When the pressures on the two sides of the booster piston 11 are substantially balanced the piston is urged by a spring 12 into the off position shown. The piston is attached to a piston-rod 13 passing through one end of the cylinder into a chamber 14 in a housing 15 secured against the end of the cylinder.

The piston-rod is in axial alignment with an auxiliary hydraulic cylinder 16 in the housing and when the piston-rod is advanced by the energisation of the booster cylinder its tapered free end first enters and closes a tapered axial bore 17 in a piston 18 working in the cylinder 16, further movement of the piston-rod then taking the piston 18 with it to apply additional pressure to the liquid in the auxiliary cylinder 16 of which the outer end is connected by a pipe-line 19 to the brake cylinders.

The chamber 14 is in communication through a pipe-line 21 with a pedal-operated hydraulic master cylinder (not shown) and is also in communication with the larger end of a stepped cylindrical bore 22 in the housing having its axis parallel to that of the auxiliary cylinder. The other end of the bore which is of smaller diameter is in communication with the outer end of the auxiliary cylinder. A stepped piston 23 works in the bore 22 and at an intermediate point in its length is formed with a lateral recess which receives a part-circular head 24 on the free end of the stem of a flat T-shaped lever 25. The head of the lever lies in a valve chamber 26 in the housing and valve heads 27 and 28 are pivotally mounted on opposite ends of the lever for engagement with spaced seatings. The seating with which the valve head 27 engages is connected through a passage 29 with atmosphere and the seating with which the valve head 28 engages is in direct communication with the adjacent end of the booster cylinder and is connected by a pipe line 30 to a source of vacuum. The chamber 26 itself is connected by a pipe 31 with the outer end of the booster cylinder. The lever 25 is loaded by a spring 32 which normally urges both valve heads towards their seatings.

The control piston 23 is preferably loaded by a light spring 33 which is located in the annular space between the shoulder at the step in the piston diameter and the end of the part of the bore of larger diameter. This space may be connected by a drilled hole 34 with the recess in the piston which receives the head of the lever 25 and is in communication with the chamber 26. The spring balances the pressure exerted on the larger end of the piston by any head in the pipe line leading to the master cylinder and also balances the effect of vacuum on the shoulder of the piston.

In the normal off position of the brakes the various parts of the mechanism are in the positions shown in Figure 1. The booster piston 11 is at the extreme left-hand end of its travel, the tapered end of the piston-rod 13 is withdrawn from the opening 17 in the piston 18 of the auxiliary cylinder 16, and the control piston 23 is against a stop defining the limit of its movement to the left, the piston holding the lever 25 in such a position that the valve head 28 is lifted from its seating. The chamber 26 and the booster cylinder on both sides of the booster piston are thus connected to the source of vacuum.

When pressure is generated by depression of the pedal actuating the piston of the master cylinder, liquid is forced into the chamber 14 and flows through the bore in the piston 18 into the auxiliary cylinder 16 to initiate the application of the brakes. The pressure in the chamber 14 is applied to both ends of the control piston but owing to the different areas of the two ends of the piston the pressure moves the control piston to the right in Figure 1 and rocks the lever 25 angularly to close the valve 28 and to lift the valve 27 from its seating.

Air is thus admitted through the passage 29 to the valve chamber 26 and flows through the pipe 31 to the outer end of the booster cylinder and moves the booster piston 11 to the right. The piston-rod 13 first closes the bore 17 in the piston 18 and then moves that piston axially in the auxiliary cylinder to increase the pressure in that cylinder and in the wheel cylinders to apply the brakes. That pressure is also applied to the smaller end of the control piston 23 in opposition to the master cylinder pressure on the other end, and when sufficient it moves the piston axially to rock the lever 25 in the opposite direction to close the valve 27. Both valves 27 and 28 remain closed and the system is in a position of equilibrium with the braking effort applied by the booster maintained steady so long as there is no further movement of the brake pedal. On any further movement of the pedal the pressure applied to the larger end of the control piston is increased and the lever 25 is rocked to open the valve 27 and connect the outer end of the booster cylinder again to atmosphere. If the pressure on the pedal is released the control piston is returned by the pressure in the hydraulic system and the lever 25 is rocked over in the opposite direction to open the valve 28 and connect the outer end of the booster cylinder to vacuum.

In the application of the brakes, as soon as the booster piston has advanced the piston-rod 13 far enough to close the bore in the piston 18 communication is cut off between the master cylinder and the auxiliary cylinder 16 so that the whole of the liquid displaced by further movement of the piston of the master cylinder is applied to the control piston which automatically ensures that the braking effort exerted by the booster cylinder is always directly proportional to the manual effort applied to the master cylinder.

Any desired relationship between the pedal load and the braking effort exerted by the booster can be obtained by selection of appropriate diameters for the opposite ends of the control piston.

Figure 2:
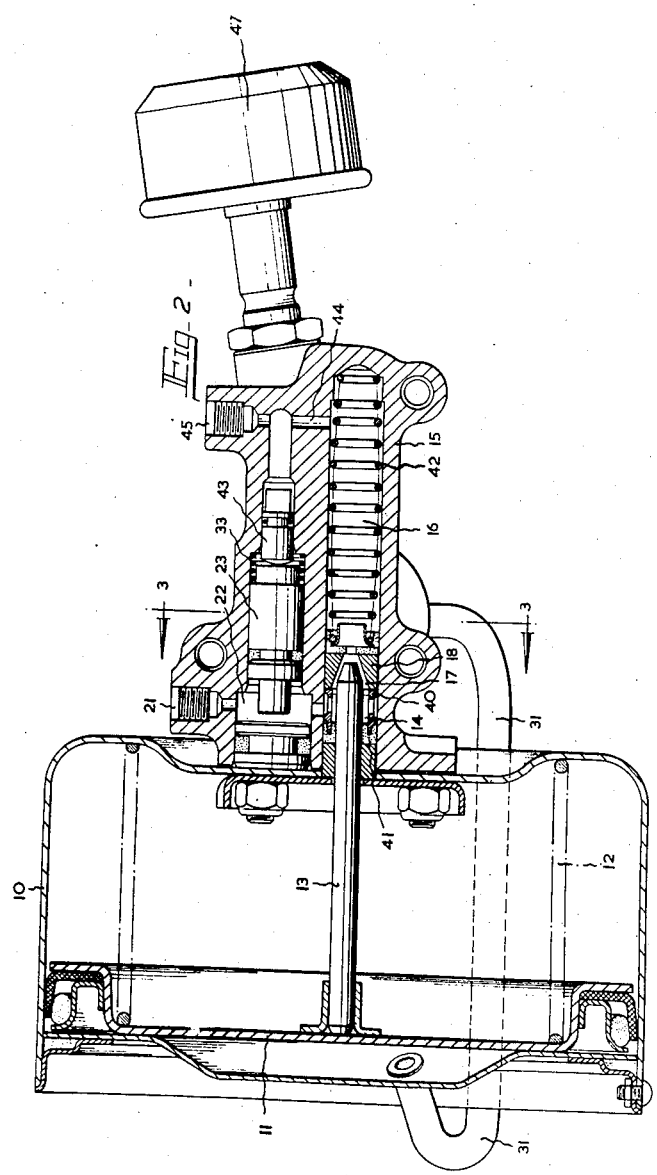
Figure 2 is a similar section of a practical construction.
Figure 3:
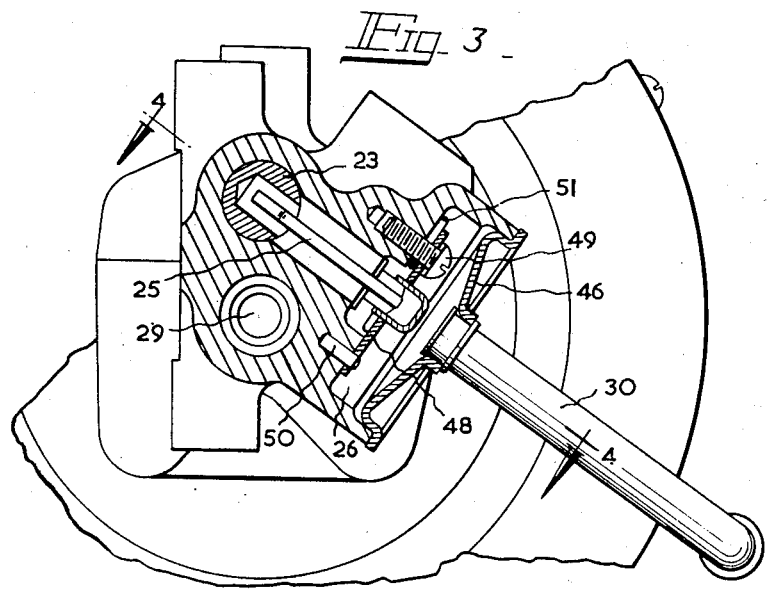
Figure 3 is a transverse section on the line 3—3 of Figure 2.
Figure 4:
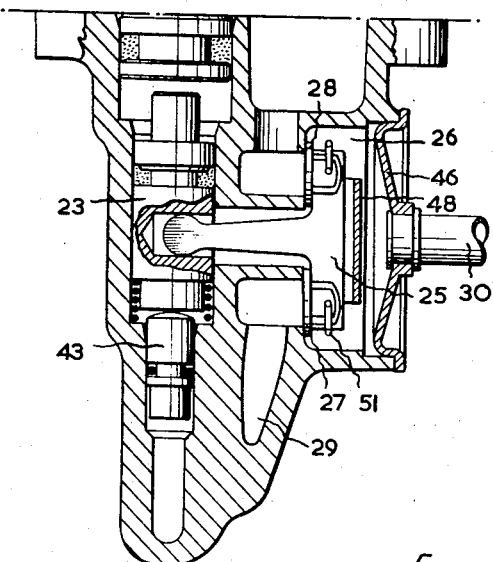
Figure 4 is a section on the line 4—4 of Figure 3.

The practical embodiment illustrated in Figures 2 to 4 incorporates the same elements as the diagrammatic embodiment shown in Figure 1 and the same reference numerals have been applied to the corresponding parts. The chamber 14 is formed by a portion of the auxiliary cylinder 16 at the end adjacent to the booster cylinder and is defined by a cage 40 interposed between a fixed seal 41 through which the piston-rod 13 passes and the piston 18. The cage forms a stop for the piston 18 against which it is normally held by a spring 42.

The control piston 23 is in two parts, its smaller end being formed by a separate plunger 43 working in the smaller end of the stepped bore. This end of the bore opens into a passage 44 connecting the outer end of the auxiliary cylinder 16 to a union socket 45 adapted to receive a pipe line leading to the brake cylinders.

The valve chamber 26 is formed by a recess in the housing 15 closed by a pressing 46 into the centre of which is secured one end of the pipe 31 leading to the outer end of the booster cylinder. The seating with which the valve head 27 engages leads to atmosphere through an air cleaner 47.

The head of the lever 25 is housed in a pressing 48 which is secured to the base of the chamber 26 by a screw 49 and is located by a dowel 50. The screw 49 also clamps between the pressing and the base of the chamber the central portion of a wire spring 51 of which the free ends are bent round to connect the valve heads pivotally to the lever, the spring normally urging both valve heads resiliently towards their seatings.

In Figure 4 the control piston, lever and valve heads are shown in the equilibrium position with both valve heads in engagement with their seatings to maintain an applied effort.

The operation of this embodiment is exactly the same as described above with reference to Figure 1.

For a booster of the atmosphere-suspended type the vacuum and air connections will be reversed, the valve 27 controlling the connecting of the booster cylinder to vacuum and the valve 28 controlling its connection to atmosphere through appropriate passages or external pipes. The spring 33 loading the control piston will not be necessary in this case.

It will be appreciated that the booster can be used with any two sources of air at different pressures. For example, in the arrangement illustrated the pipe 30 could be connected to atmosphere and the pipe 29 to a source of air at a pressure higher than atmospheric.

I claim:

1. In a power-assisted hydraulic control system incorporating a pneumatic motor unit operated by a pneumatic pressure difference and producing, from a primary hydraulic pressure, an amplified secondary hydraulic pressure, a control valve structure having two co-axial bores, a piston slidable with its ends in said bores, respectively, one end of said piston being subjected to the primary hydraulic pressure, the other end being subjected to the secondary hydraulic pressure, said control valve structure having first and second poppet valve ports communicating with a source of high pneumatic pressure and a source of low pneumatic pressure, first and second poppet valves controlling said ports respectively, a rigid T-shaped valve member having a cross-piece and a leg extending at right angles to said cross-piece, said first and second poppet valves being pivotally connected to opposite ends of said cross-piece and the free end of said leg engaging said piston, and spring means urging said valves onto their seats, the T-shaped valve member being tilted about its pivotal connection with said second poppet valve to lift said first poppet valve off its seat when the piston is moved in one direction by the action of the primary hydraulic pressure, and being tilted about its pivotal connection with said first poppet valve to lift said second poppet valve off its seat when the piston is moved in the opposite direction by the action of the secondary hydraulic pressure.

2. A control valve structure as set forth in claim 1, incorporating a spring acting to urge said piston in a direction to lift said second poppet valve off its seating.

3. A control valve structure as set forth in claim 1, wherein that end of the piston acted on by the primary hydraulic pressure is of greater area than that acted on by the secondary hydraulic pressure.

References Cited in the file of this patent

UNITED STATES PATENTS

| | | |
|---|---|---|
| 2,265,817 | Rockwell | Dec. 9, 1941 |
| 2,381,989 | Stelzer | Aug. 14, 1945 |
| 2,383,682 | Price | Aug. 28, 1945 |
| 2,532,462 | Rockwell | Dec. 5, 1950 |
| 2,658,348 | Stelzer | Nov. 10, 1953 |
| 2,756,845 | Banker | July 31, 1956 |